United States Patent [19]

Delassus et al.

[11] Patent Number: 4,557,667
[45] Date of Patent: Dec. 10, 1985

[54] ELECTROMAGNETIC PUMP

[75] Inventors: Jean Delassus, Montmorency; Lambert Pierrat, Grenoble, both of France

[73] Assignees: Electricite de France; CEM - Compagnie Electro-Mecanique, both of Paris, France

[21] Appl. No.: 677,410

[22] Filed: Dec. 3, 1984

[30] Foreign Application Priority Data

Dec. 1, 1983 [FR] France .................. 83 19209

[51] Int. Cl.[4] .................. H02K 44/02; H02K 44/04
[52] U.S. Cl. .......................... 417/50; 310/11
[58] Field of Search .................. 417/50; 310/11

[56] References Cited

U.S. PATENT DOCUMENTS

| 2,920,571 | 1/1960 | Fenemore et al. | 417/50 |
| 3,030,888 | 4/1962 | Reltz | 417/50 |
| 4,166,714 | 9/1979 | Reinass | 417/50 |

FOREIGN PATENT DOCUMENTS

| 1340324 | 9/1963 | France . |
| 2449998 | 9/1980 | France . |
| 699925 | 11/1953 | United Kingdom . |

*Primary Examiner*—William L. Freeh
*Attorney, Agent, or Firm*—Sughrue, Mion, Zinn, Macpeak & Seas

[57] ABSTRACT

Electromagnetic pump for electrically-conductor fluid containing an external pipe (1) enveloped by magnetic half-yokes (11, 11') containing slots (14) in which half-coils (19, 19') are installed forming two polyphase half-windings (35, 35') permitting a symmetry plane.

The fluid is contained in a duct (31) comprised between the external pipe (1) and an internal pipe (5) which is closed and contains a magnetic core (24). The duct (31) is provided with partitions (29, 29', 34) which separate the duct (31) into two active half-ducts (32, 32') in which the fluid flows and two passive streams (33) in the vicinity of the joint plane in which the fluid scarcely flows at all.

Pump with a high degree of efficiency and easy to dismantle.

6 Claims, 5 Drawing Figures

ELECTROMAGNETIC PUMP

BACKGROUND OF THE INVENTION

This invention relates to an electromagnetic pump for electricity-conducting fluids, comprising an external pipe around which a magnetic yoke is installed in the form of slotted plates in which a polyphase winding is housed consisting of induction coils with the same axis as the external pip and an internal pipe fitted inside the external pipe and with the same axis as the latter, and containing inside a magnetic core capable of creating with the polyphase winding a magnetic field applying a force to the fluid in the pipe between the two pipes so that it circulates axially.

This electromagnetic pump is described in document FR-A- No. 1 599 876.

The polyphase winding produces a slipping field whose lines flow through the duct and are closed by the magnetic core inside the duct. Under the effect of this axisymetric configuration variable field, circular currents are induced in the fluid in the duct and the reaction of these currents on the radial induction produces an axial motive force imparting movements of the fluid.

These pumps are used notably to pump liquid sodium used to cool nuclear reactors.

In all these pumps it is necessary to be able to dismantle the magnetic yoke and the windings without previously opening and fully draining the sodium circuit which may be radioactive.

For this purpose, in the known pump, the external pipe is cut off at the back and the circulation of the fluid after flowing in the duct is returned in the opposite direction in the axial section of the internal pipe. It is thus possible to release the yoke and winding from the back.

The efficiency of this pump is relatively low.

SUMMARY OF THE INVENTION

According to the invention the feature of the pump without these drawbacks is that the internal tube is plugged and that the coils are each installed in a slot and each consist of a first half-coil and a second half-coil terminating by involutes, the first half-coil being coupled electrically together by their involutes to form a first half-winding, the second half-coils being coupled electrically together by their involutes to form a second half-winding, the said first and second half-windings forming the polyphase winding and being installed on either side of a joint plane passing through the axis of the pipes and being housed in the magnetic half-yokes grouped along the joint plane to form the magnetic yoke, and that the duct contains a means of separation installed in the vicinity of the parts of the external pipe not enveloped by half-coils, the which means of separation separating the duct into two active half-ducts and preventing the hydraulic circulation of the fluid outside the active half-ducts but permitting electrical conduction between these two active half-ducts.

As the winding and yoke are separable into two along the joint plane it is possible to disassemble them leaving the hydraulic circuit conveying the fluid intact.

In the pump according to the invention, the fluid always flows in the same direction through the duct without returning via the internal pipe, which improves the efficiency.

In the areas of the duct in the vicinity of the parts of the external tube not enveloped with half-coils (hence in the vicinity of the joint plane), there is no magnetic flux and the fluid is not the centre of any force to make it advance, so that the fluid tends to flow back locally. Owing to the means of separation of two fluid streams through which a magnetic flux does not flow, are isolated from the two active half-ducts.

The means of separation enable the electric current to flow from an active half-duct to the other so that the fluid in these half-ducts is the centre of a force tending to impart movement to it.

According to a preferential point in the invention, the means of separation contain longitudinal metal partitions delimiting between the two active half-ducts two streams filled with conductor fluid, the said longitudinal partitions being associated to transverse partitions preventing the fluid circulating in the streams.

Thus the electrical resistance of these means of separation is low given that the resistivity of sodium is lower than that of sodium-resistant metals (stainless steel). Moreover, through the various separations, notably the longitudinal ones, the turbulence in the active half-ducts is reduced to a minimum at their edges.

It is preferable to provide a slight fluid leak between the two active half-ducts and the passive streams, so as to discharge the heat which is formed by Joule effect in the passive streams.

To discharge the heat developing in the half-coils, a coolant fluid is made to circulate in the said half-coils.

It should be observed that the means of conveying and draining the coolant fluid can be easily housed in the vicinity of the joint plane. The same applies to the axial connections between half-coils in the same half-winding which ensure the polyphase distribution of the current is the polyphase winding.

The magnetic core preferably consists of a stack of thin, longitudinal plates curved along a circle involute profile so that the magnetic core covers the whole area of the active half-ducts.

According to a preferential point in the invention, the internal pipe terminates at each end in a shield, the said shields having a hydrodynamic profile and being centred in relation to the external pipe by ribs integral with the said pipe, the ribs associated to one of the shields being welded to it and the ribs associated to the other not being welded to provide for axial expansion of the pipes.

The invention will now be described in more detail referring to a specific method of construction mentioned as non-exhaustive example and shown on the appended drawings.

DESCRIPTION OF THE PREFERRED EMBODIMENT

According to the invention the pump contains an external tube 1 with a conductor fluid inlet 2 and outlet 3 supported by bearing blocks 4.

Figure 1:
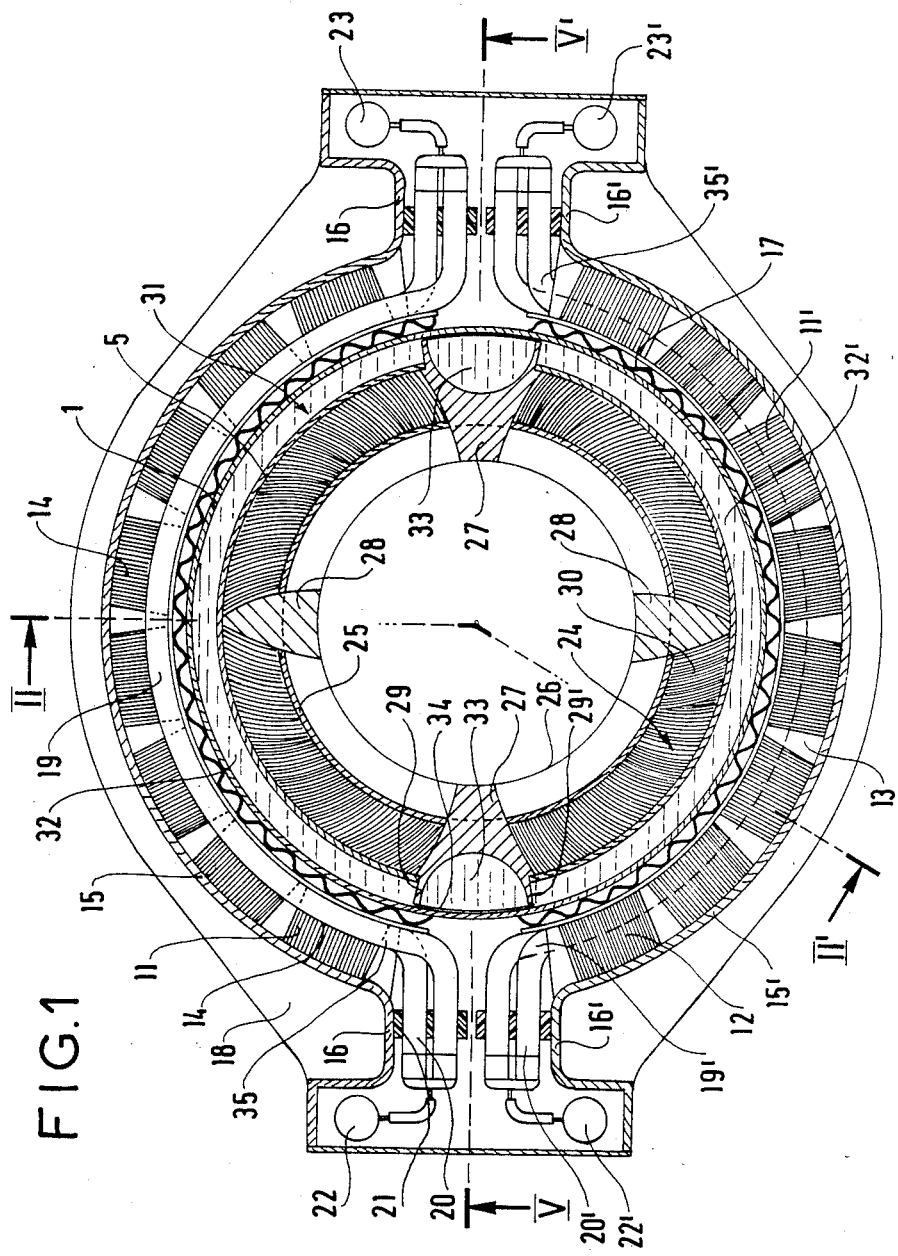
FIG. 1 is a cross-section through the central plane of the pump.
Figure 2:
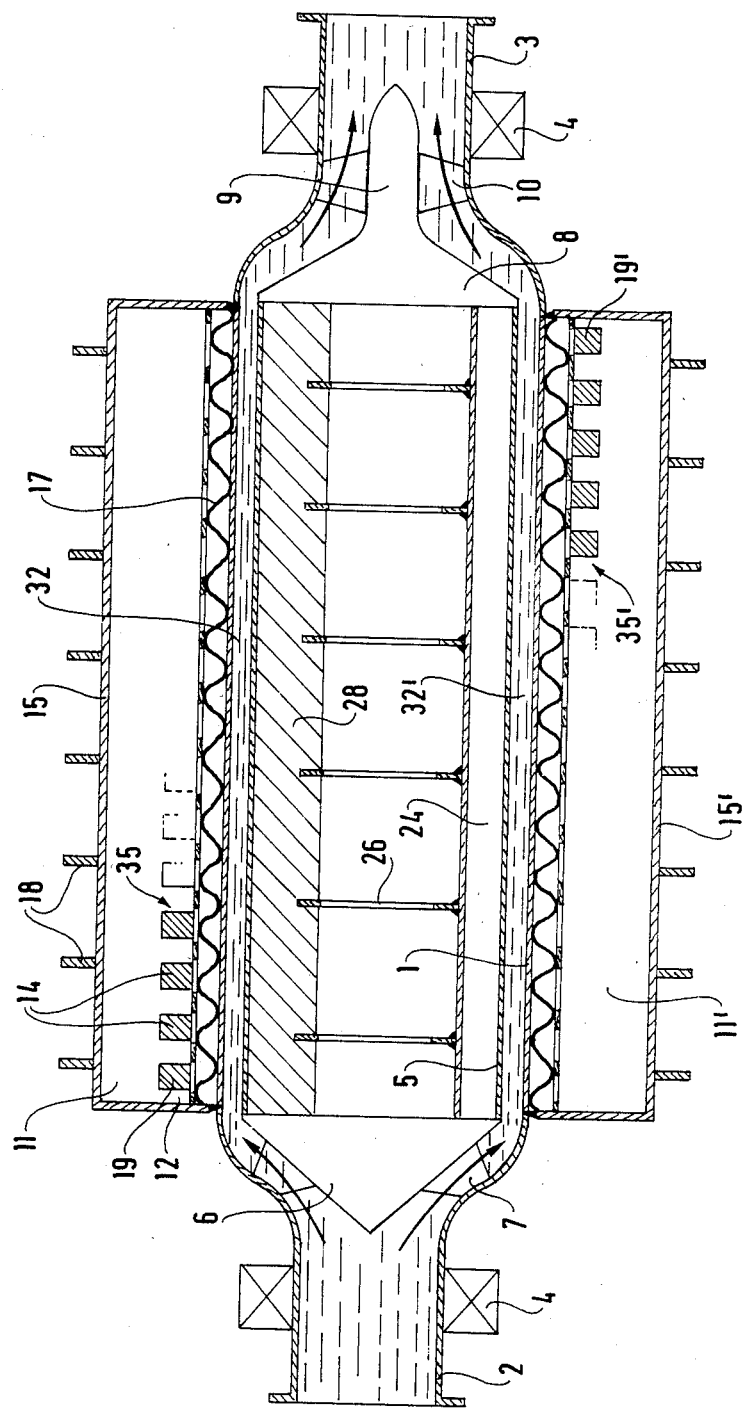
FIG. 2 is an offset longitudinal section marked II—II' on FIG. 1.
Figure 5:
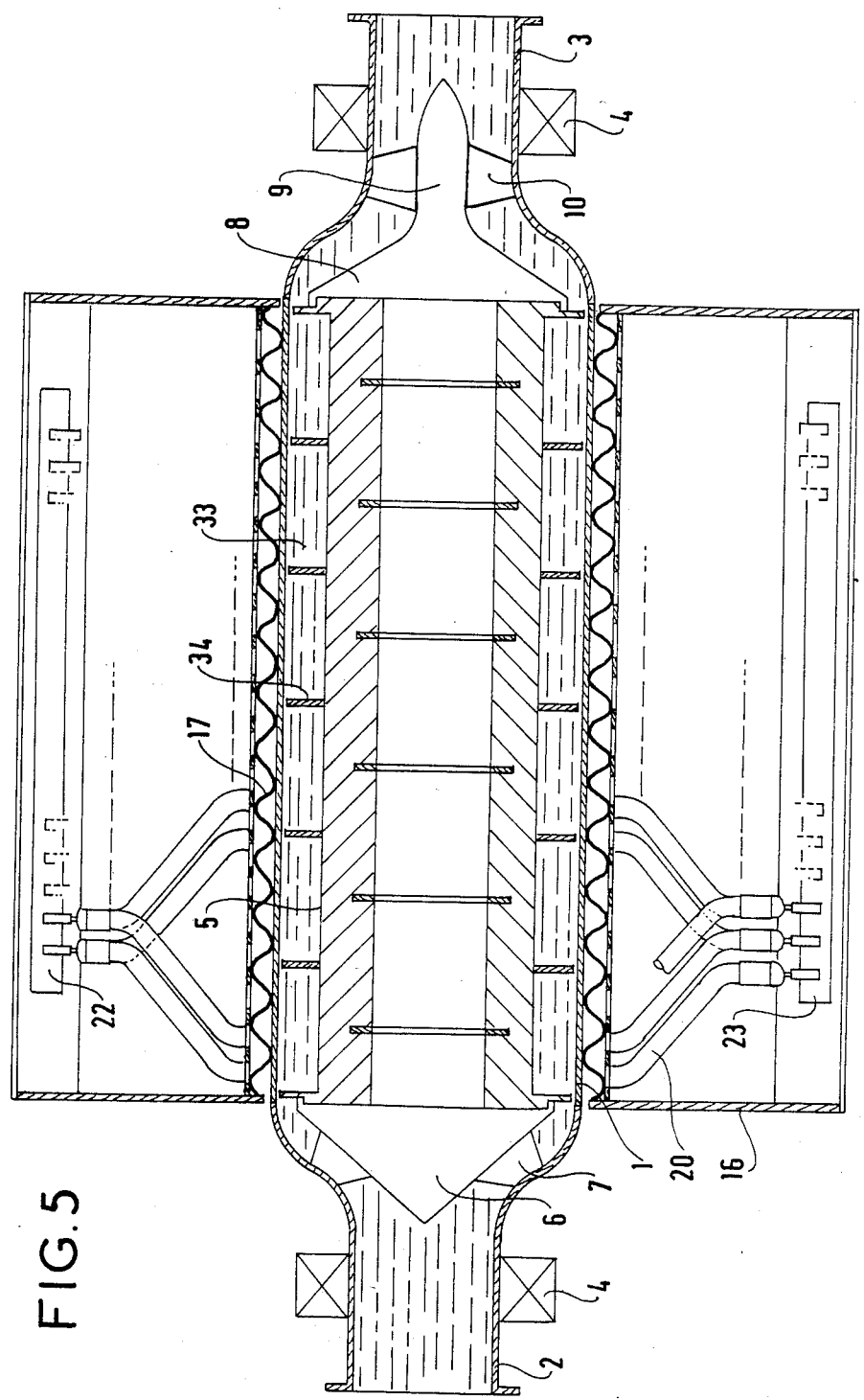
FIG. 5 is a longitudinal section along the joint plane marked V—V' on FIG. 1.

An internal pipe 5 is installed inside external pipe 1 and with the same axis (see FIGS. 2 and 5).

The internal pipe 5 is blanked off on the inlet side by a tapered shield 6 welded to ribs 7, themselves welded to the external pipe 1. On the outlet side the internal pipe is blanked off by a fusiform shield 8 containing an elongated axial section 9, which can slip inside ribs 10 welded to the external pipe 1.

Around the external pipe 1 two magnetic half-yokes are installed 11, 11' separated by joint plane V—V'. The two half-yokes 11, 11' consist of longitudinal bundles of magnetic plates 12 containing slots 14 separated by V-shaped shims 13.

The two half-yokes 11, 11' are installed in two half-carcasses 15, 15' in the form of half-cores with extensions 16, 16' parallel to joint plane V—V'.

Between the half-carcasses 15 and 15' and the external pipe 1 insulating shims 17 are provided. The half-carcasses 15 and 15' are rigidified by stiffening ribs 18.

Half-coils 19, 19' terminating by involutes 20, 20' parallel to the joint plane are installed in slots 14.

The involutes 20 are used to connect the half-coils 19 on one side of the joint plane to produce a first half-winding 35 and involutes 20' are used to connect the half-coils 19' on the other side to form a second half-winding 35'.

Involutes 20, 20' are wedged by insulating shims 21 inside extensions 16, 16' or the half-carcasses 15, 15'.

To cool the half-coils 19, 19', water is made to flow inside, the which is conveyed by an inlet drain 22 resp. 22' and flows out through an outlet drain 23 resp. 23'.

A magnetic core 24 is installed inside the internal pipe 5, contained between the wall of pipe 5 and four longitudinal walls 25 arranged in cylinder form with the same axis as pipe 5.

These walls 25 are welded to metal rings 26 with the same axis as pipe 5.

Walls 25 are separated by separators 27 crossing the joint plane V—V' and by separators 28 crossed by the plane perpendicular to the joint plane passing through the axis of pipes 1, 5.

Separators 27 have two concave side faces which extend outside pipe 5 via two longitudinal partitions 29, 29'.

Separators 28 contain two convex side faces. It is thus possible to stack, between the wall of internal pipe 5 and the four longitudinal walls 25, finned longitudinal magnetic plates 30, curved along a circle involute profile providing total and uniform filling so as to form magnetic core 24.

The longitudinal partitions 29, 29' of each of the separators 27 arrived in the vicinity of the wall of external pipe 1 and divide duct 31 located between internal pipe 5 and external pipe 1 into two active half-ducts 32, 32' and two passive streams 33.

The longitudinal partitions 29, 29' have practically the same spacing as involutes 20 located on either side of the joint plane. Between the longitudinal partitions 29 and 29' a certain number of transverse partitions 34 (see FIG. 5) have been installed which prevent any fluid circulating in the passive streams 33. Partitions 29, 29' and 34 are, for example, in stainless steel which is sodium-resistant.

Joint plane V—V' is s symmetry plane for the pump.

Figure 3:
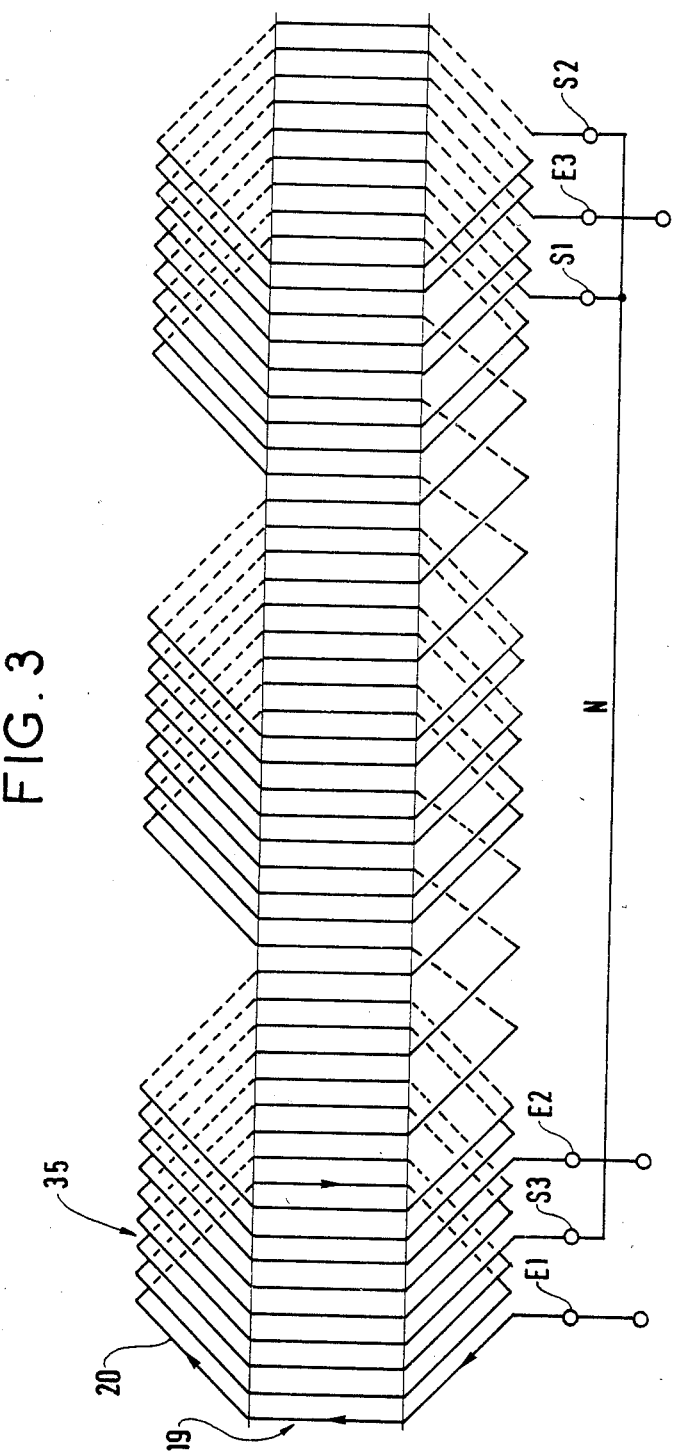
FIG. 3 is a diagram of one of the half-windings.

FIG. 3 shows a connection diagram obtaining a polyphase half-winding, $E_1$, $E_2$, $E_3$ representing the low frequency, three-phase current inputs and $S_1$, $S_2$, $S_3$ the three-phase current outputs forming the neutral N.

The right-hand parts located between the two longitudinal lines correspond to the half-coils 19 forming half-winding 35. The half-coils are coupled together by involutes 20.

Figure 4:
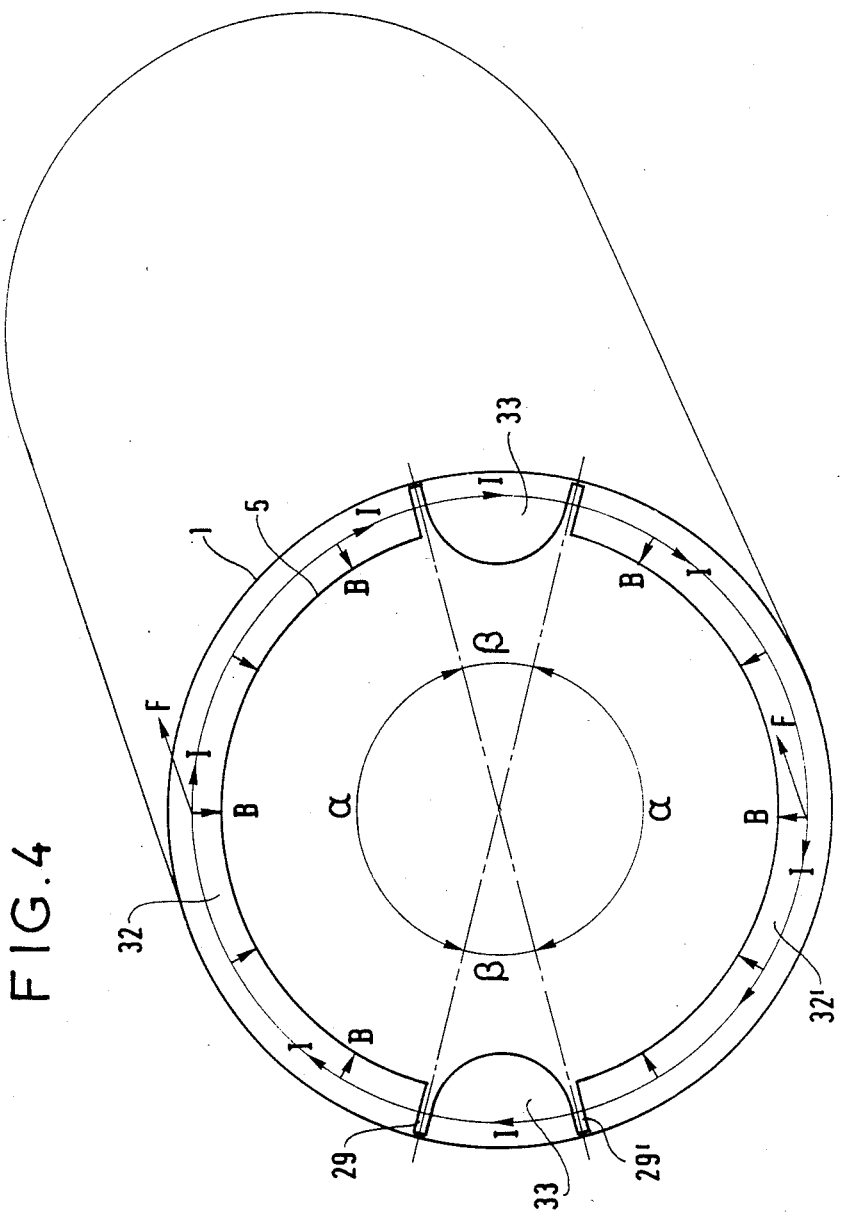
FIG. 4 is a functional electromagnetic diagram in a cross-sectional view.

FIG. 4 shows a cross-sectional view of an electromagnetic functional diagram.

Duct 31 is filled with liquid sodium. When the polyphase half-windings are supplied with current, they produce a flow through duct 31 closing by the magnetic core.

As this flow is variable circular currents I are induced in the circumferential direction. Partitions 29 are fairly thin and in any event are electricity conductors so that the lines of current can close by going around duct 31.

Owing to the geometry of half-coils 19, the radial magnetic induction B is only created in the active half-ducts 32, 32'. So that force F due to the reaction of the induction B on the currents I only originates in the active half-ducts 32, 32'. Movement is imparted to the conductor fluid (sodium) by the force F and flows with no turbulence along longitudinal partitions 29.

Per contra, in the passive streams, the fluid is not subject to the force F and the side partition 34 prevent the fluid flowing back.

The active half-ducts have, for example, an angle of opening of 72° and 77°, the passive streams have an additional angle of opening of 18° to 13°.

It must be observed that the arrangement of the magnetic plates in the magnetic core provides highly homogeneous distribution of the magnetic field through the two active half-ducts, whence correct distribution of the motive force resulting in a regular and turbulence-free flow of the fluid.

Finally the slight fluid leak between the two active half-ducts and the passive streams provides the initial filling of the passive streams with fluid then its renewal, preventing any excessive heating in this stream.

The two half-carcasses can be fitted around the internal pipe after pipes 1 and 5 have been placed in position with duct 31 full of sodium. The two half-carcasses simply have to be assembled on the spot. To disassemble, separate the two half-carcasses and remove them, there being no need to drain the sodium inside duct 31.

We claim:

1. In an electromagnetic pump designed for electricity conducting fluid comprising an external pipe (1) around which a magnetic yoke (11, 11') is installed in the form of plates (12) containing slots (14) in which a polyphase winding (35, 35') is housed, consisting of induction coils (29) with the same axis as the external pipe (1) and an internal pipe (5) installed inside the external pipe (1) with the same axis as the latter and containing a magnetic core (24) inside, capable of creating with the polyphase winding (35, 35'), a magnetic field applying a force to the fluid in duct (31) between the two pipes (1, 5) to make it flow axially, the improvement wherein the internal tube (5) is blocked and in that coils (19, 19') are each installed in a slot (14) and each consist of a first half-coil (29) and a second half-coil (19') terminating by involutes (20, 20'), the first half-coils (19) being coupled together electrically by their involutes (20) to form the first half-winding (35), the second half-coils (19') being coupled together electrically by their involutes (20) to form a second half-winding (35'), the said first and second half-windings (35, 35'), forming the polyphase winding and being installed on either side of joint plane passing through the axis of pipes (1, 5) and being housed in the magnetic half-yokes (11, 11') grouped along the joint plane to form the magnetic yoke, and in that duct (31) contains means of separation (29, 29') installed in the vicinity of the parts of the external pipe (1) not enveloped by the half-coils (19, 19'), the said means of separation (29, 29') separating the duct into two active half-ducts (32, 32')and preventing the hydraulic circulation of the fluid outside the active half-ducts (32, 32') but permitting electrical conduction between the two active half-ducts (32, 32').

2. Electromagnetic pump according to claim 1, wherein the magnetic core (24) consists of a stack of thin longitudinal magnetic plates (25) curved along a circle involute profile.

3. Electromagnetic pump according to claim 1, wherein the internal pipe (5) terminates at each end in a shield (6, 8), said shields (6, 8) having hydrodynamic profiles and being centered in relation to the external pipe (1) by ribs (7, 10) integral with said pipe (10, and wherein ribs (7) associated with one of shieldsd (6) are welded thereto and ribs (10) associated with the other shield (8) are not welded to the shield to provide for axial expansion of the pipes (1, 5).

4. Electromagnetic pump according to claim 1, wherein means of separation (29, 29') comprise longitudinal metal partitions (29, 29') delimiting between the two active half-ducts (32, 32') two streams (33) filled with conductor fluid, the said longitudinal partitions (29, 29') being associated with transverse partitions (34) preventing the fluid circulating in the streams (33).

5. Electromagnetic pump according to claim 4, further comprising means forming a slight fluid leak between the active half-ducts (32, 32') and the passive streams (33) so as to provide for the initial filling of the said streams (33) and the renewal of the fluid in order to cool them.

6. Electomagnetic pump according to one of claims 1, 4 and 5, furtherd comprising means for flowing a coolant fluid through the half-coils (19, 19').

* * * * *